United States Patent [19]

Dorica et al.

[11] Patent Number: 5,290,454
[45] Date of Patent: Mar. 1, 1994

[54] PROCESS FOR REMOVAL OF SUSPENDED SOLIDS FROM PULP AND PAPER MILL EFFLUENTS

[75] Inventors: Joseph Dorica, Pointe Claire; Steven Prahacs, Beaconsfield; Pritham Ramamurthy, Montreal, all of Canada

[73] Assignee: Pump and Paper Research Institute of Canada, Pointe Claire, Canada

[21] Appl. No.: 974,604

[22] Filed: Nov. 12, 1992

[51] Int. Cl.⁵ .............................................. C02F 1/52
[52] U.S. Cl. ................................... 210/710; 162/189; 210/713; 210/777; 210/784; 210/919; 210/928
[58] Field of Search ......................... 162/60, 189, 190; 210/702, 724, 726, 712, 713, 777, 778, 928, 784, 710, 919

[56] References Cited

U.S. PATENT DOCUMENTS

| | | | |
|---|---|---|---|
| 1,667,465 | 4/1928 | Wait | 210/784 |
| 1,937,481 | 11/1933 | Raisch et al. | 210/784 |
| 2,534,760 | 12/1950 | Ellila | 210/710 |
| 2,715,466 | 8/1955 | Esposito | 210/777 |
| 3,639,206 | 2/1972 | Spruill | 210/726 |
| 3,959,129 | 5/1976 | White et al. | 210/778 |
| 4,115,188 | 9/1978 | O'Brien | 162/190 |
| 4,687,583 | 8/1987 | Lankinen et al. | 210/928 |
| 4,761,238 | 8/1988 | Hynninen | 210/725 |
| 4,769,155 | 9/1988 | Dwyer | 210/728 |
| 4,782,789 | 11/1988 | Canzoneri | 210/703 |

FOREIGN PATENT DOCUMENTS

| | | |
|---|---|---|
| 49-078367 | 7/1974 | Japan . |
| 53-058002 | 5/1978 | Japan . |
| 89174242 | 2/1991 | Japan . |
| 981233 | 12/1982 | U.S.S.R. . |

OTHER PUBLICATIONS

Lardieri, N. J., J. W. Dappen, Tappi, 50 (11), 125A (1967) "Suspended Solids Recovery and Disposal at Scott Paper Co., Chester Pa."
"Scott Water Purification Program", Nov. 17, 1951.

*Primary Examiner*—Peter A. Hruskoci
*Attorney, Agent, or Firm*—Swabey Ogilvy Renault

[57] ABSTRACT

A process is for removal of suspended solids including resin and fatty acids from pulp mill effluents including Chemi-Thermo-Mechanical Pulp (CTMP) mill effluents. The process involves filtration of untreated or primary treated effluents through a mat of primary sludge, pulp or woodroom sludge. A sludge mat is formed on a wire screen or punched drum and the effluent to be treated is filtered through the mat. Most of the suspended solids and a part of colloidal material and dissolved solids are retained by the mat. Following the filtration stage, the sludge is dewatered and removed. A portion of the sludge is recycled to form the mat for the next filtration cycle, while the excess sludge is purged. The filtration is achieved by the application of vacuum below the filter mat or pressure over mat. The process will produce treated effluent with low suspended solids and sludge at high solids consistency and eliminate the need not only for a clarifier but also for sludge thickening and filtration units often used in pulp mills. Calcium chloride may be added to the effluent prior to primary settling or before filtration, to enhance the removal of suspended and total solids.

19 Claims, 6 Drawing Sheets

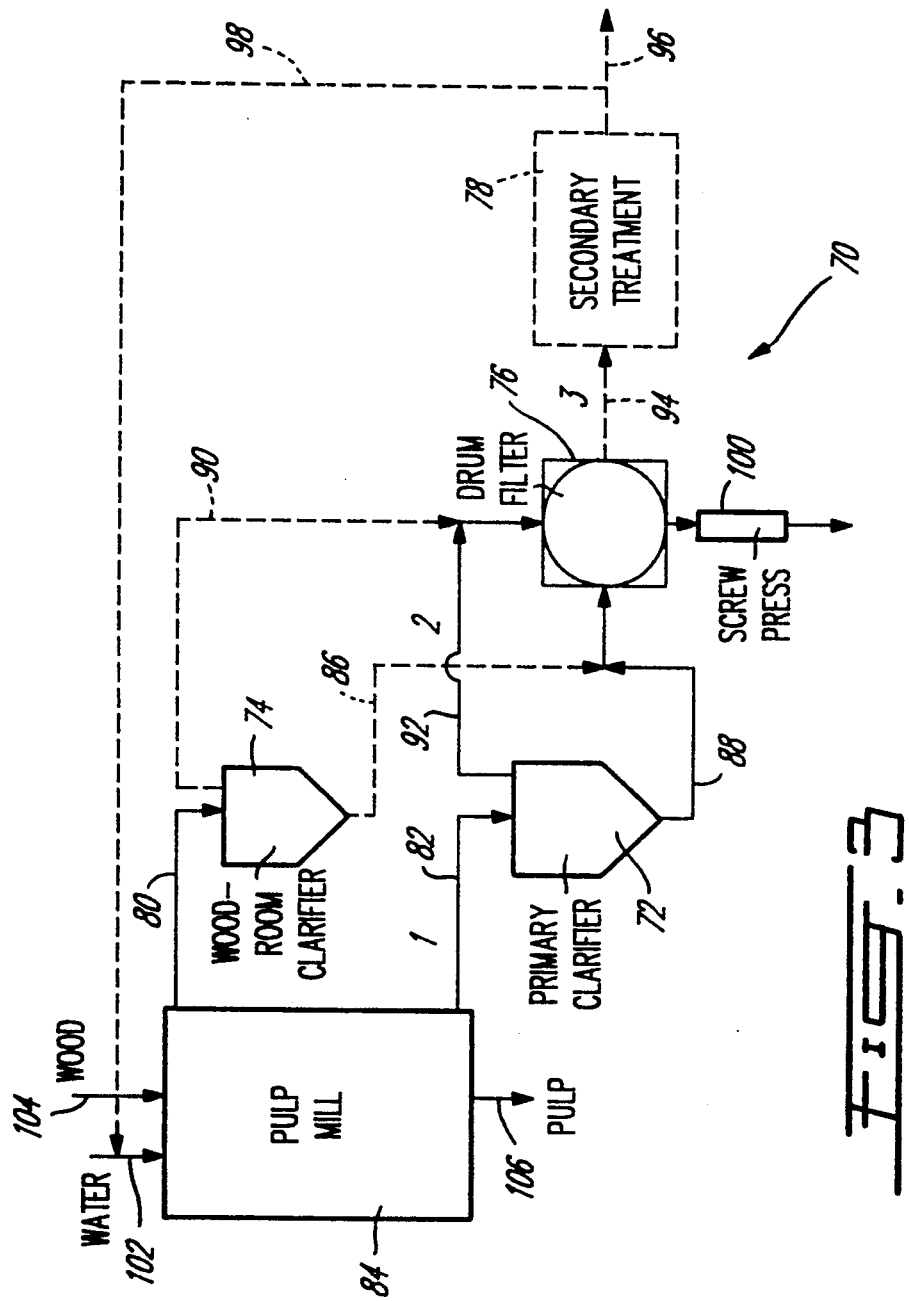

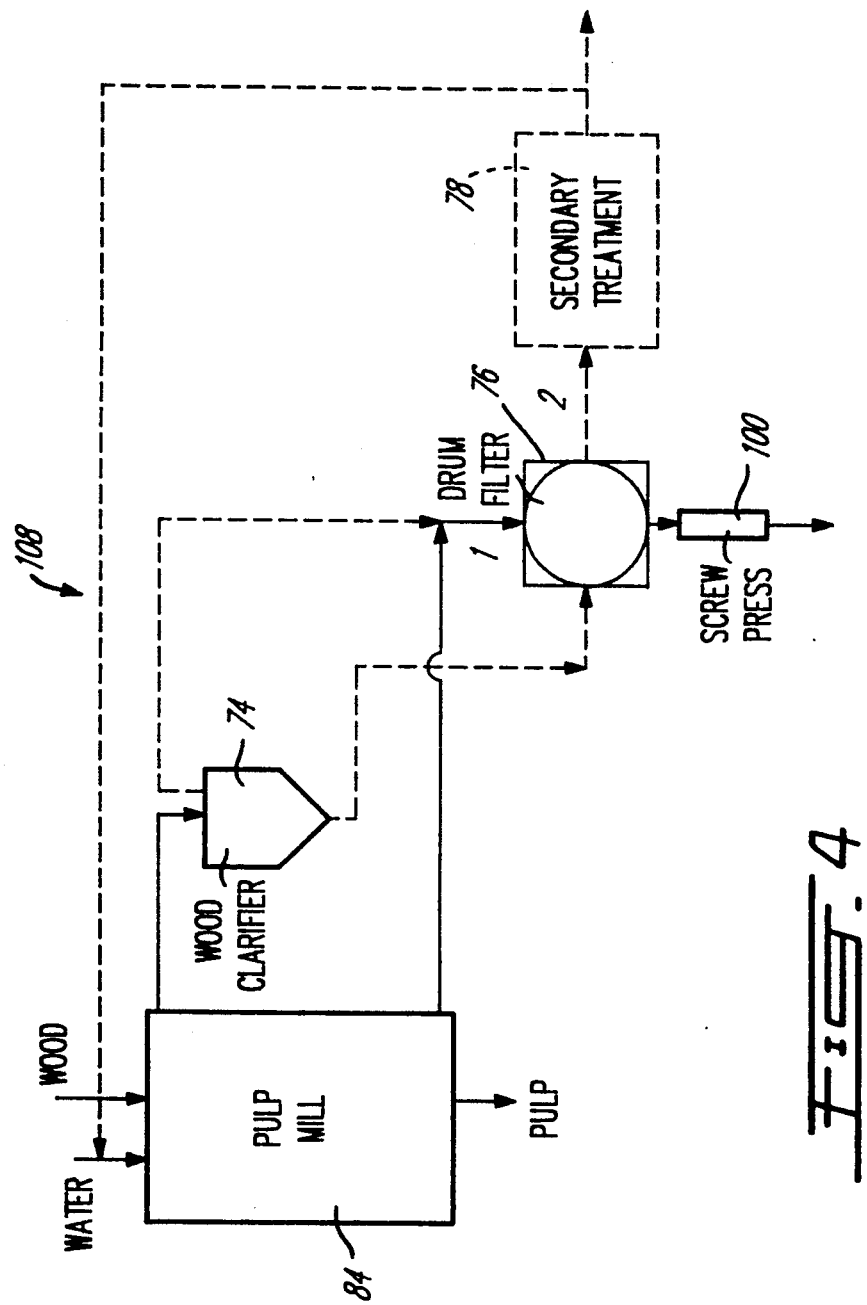

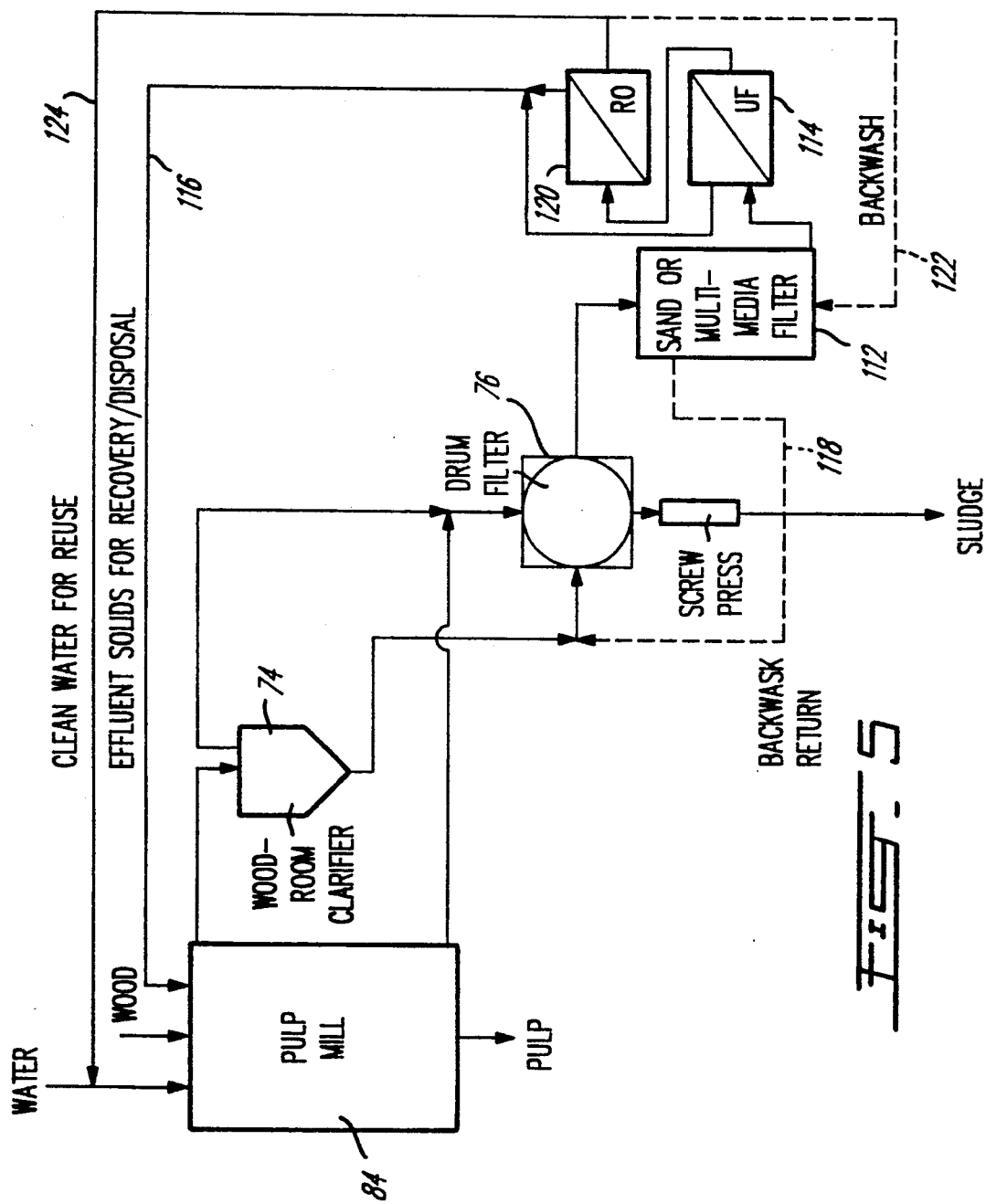

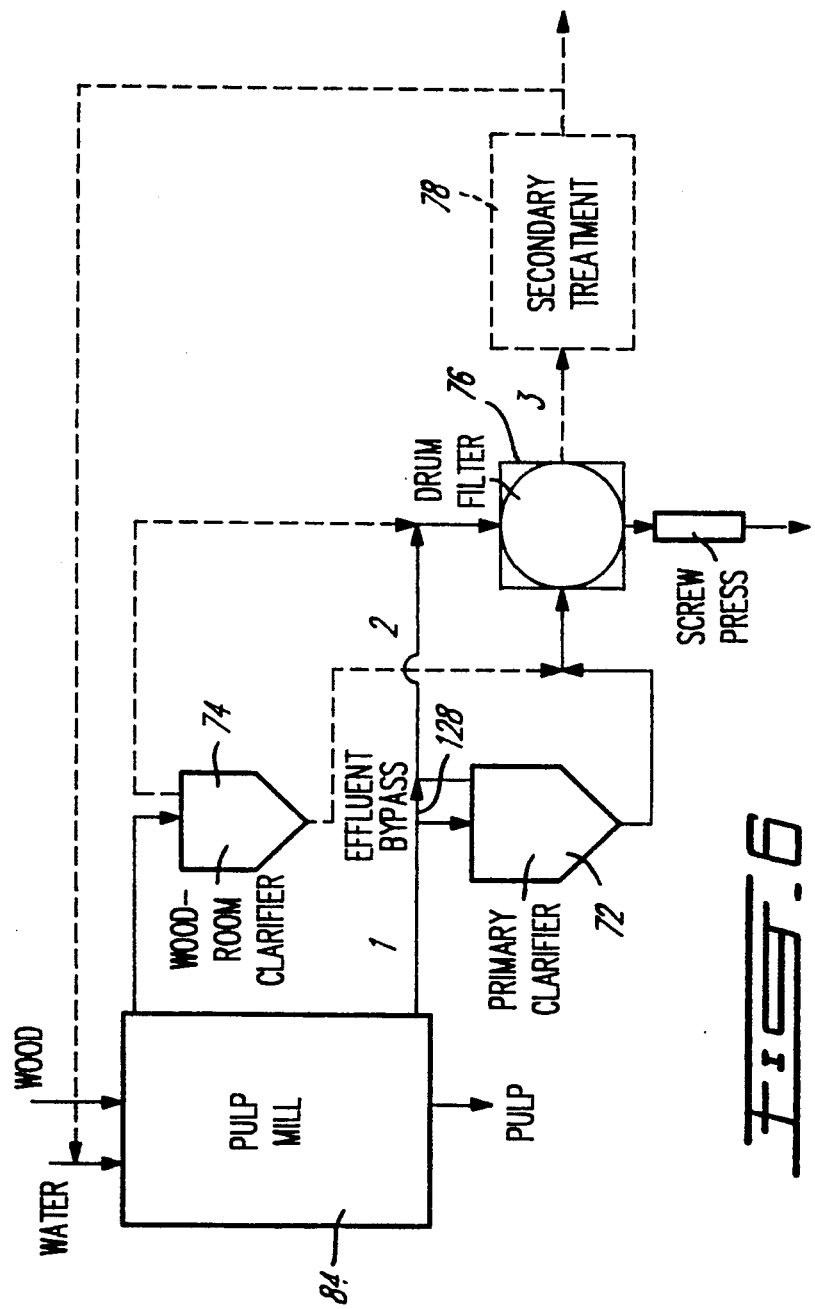

PROCESS FOR REMOVAL OF SUSPENDED SOLIDS FROM PULP AND PAPER MILL EFFLUENTS

BACKGROUND OF THE INVENTION

1. Field of invention

The present invention relates to removal of suspended solids, including resin and fatty acids from untreated or primary treated pulp mill effluents, including CTMP mill effluents.

The present invention will facilitate the treatment of pulp mill effluents by reducing or eliminating the input of suspended solids to the biological reactors and physical separation processes.

2. Description of Prior Art

The presence of excessive amounts of total suspended solids (TSS) is detrimental to biological treatment of effluents, as has been observed in several treatment plants in Canada and Scandinavia. The suspended solids also interfere in physical separation processes employed in closed-cycle mill applications, namely evaporation, membrane filtration and freeze crystallization.

The principal methods for separation of solids from pulp mill effluents include: a) settling, b) flotation, and c) filtration. A number of studies have been performed on the conventional settling augmented by coagulation, in order to improve treatment performance. These studies included optimization of pH, temperature, retention time and the sequence of chemical addition.

O'Brian and O'Brien, in U.S. Pat. No. 4,115,188 discloses that acidification to pH <4 followed by addition of calcium hydroxide to pH >10 caused coagulation and precipitation of suspended solids from the paper mill waste water. Japanese patent JP 53,058,002, assigned to Sanyo Kokusaku Pulp, proposes acidification of the waste liquor and treatment with an anionactive polyacrylamide-based flocculent, to remove suspended solids. U.S. Pat. No. 3,959,129 describes a method for removing ink and suspended particles by treating the waste deinking effluent stream with ferric chloride and calcium hydroxide followed by vacuum filtration through a <250 micron screen. Japanese patent JP 49,078,367 shows treatment of pulping waste effluent streams with magnesium chloride and calcium hydroxide to enhance settling rates. Japanese Patent 89,174,242 of Toyo Roshi KK, describes filtration of effluents through polyolefin, polyester and polyacryl fibers to remove suspended solids.

Kopylov, SU Pat. No. 981,233, describes a single cylinder flotation cell for removal of suspended solids from the pulp and paper industry effluents. Canzoneri, U.S. Pat. No. 4,782,789, proposed a double cell (concentric) process for removal of suspended solids.

Excess water from a paper machine vacuum filter savealls has been treated by a precoat filter to recover fibers (Lardieri, N.J. and J. W. Dappen, TAPPI. 50 (11), 125A (1967)). Pulp was used as the precoat medium and the recovered fibers, along with the precoat pulp, were bleached and used for tissue manufacture.

The above methods for treatment of waste streams from pulp and paper mills have several shortcomings, including (a) the use of expensive pulp as the filter medium in the filter, (b) no recycle of the precoat material or water, (c) limited removal of suspended solids, (d) large space requirements, (e) high capital costs, (f) production of dilute sludges that require dewatering before disposal, and (g) the need for chemical agents such as lime, alum and polyelectrolytes which, in addition to increasing the sludge volume, may be detrimental to the environment during sludge disposal.

SUMMARY OF THE INVENTION

In accordance with the invention there is provided a process for removal of suspended solids from a pulp mill effluent comprising: i) forming a mat of a non-biological sludge on a porous support, and ii) passing pulp mill effluent comprising an aqueous vehicle containing suspended solids through said mat whereby the suspended solids are retained in said mat and aqueous vehicle passes through said mat and said porous support.

The sludge is preferably a primary sludge, woodroom sludge, or a mixture of primary and secondary sludge i.e., a mixture of non-biological and biological sludge.

The suspended solids which are removed in accordance with the invention are those found in pulp mill effluents, including colloidal particles of resin and fatty acids; the pulp mill effluent may be the solids-containing effluent from a primary clarifier, a woodroom effluent, a pulp or paper mill effluent or mixtures thereof.

The mat is suitably formed on the support in a thickness of 0.5 to 25 mm with a specific filtration resistance of $4 \times 10^{12}$ to $1 \times 10^{13}$ m/kg. Such a mat is typically formed from a pulp mill sludge having a solids concentration of 3% to 5%, preferably about 4%, by weight.

When the present invention is practiced for treating effluents the total suspended solids level can be decreased by 85-98%. This high degree of removal is achieved particularly with CTMP mill effluents which typically have higher suspended solids level (500-1000 ppm), compared to kraft mill effluents (50-100 ppm).

Improved removal of suspended solids facilitates the subsequent secondary biological treatment. Further reduction of the suspended solids can be achieved by the use of suitable sand or multi-media filters. High removal of suspended solids is required for subsequent membrane treatment and/or other concentration techniques.

The process of the invention can be employed to decrease effluent resin and fatty acid content, as well as to lower biochemical oxygen demand, chemical oxygen demand and toxicity to fish, by removing solids which utilize oxygen and are toxic to fish.

The process may also be exploited to remove solids in biological system effluents in the pulp mill, and to remove solids from specific mill streams, for example, washing stage effluent.

The aqueous vehicle of the effluent, from which the suspended solids have been removed can be subjected to secondary treatment to produce water of high quality or purity for recycling within the pulp mill.

Suitable secondary treatments include the use of a sand or multi-media filter, which can be followed by separation processes such as use o ultra-filtration membranes, reverse osmosis, evaporation or freeze crystallization; in this way substantially all contaminants can be removed and clean water which is recovered can be recycled to the pulp mill, and the solids concentrate can be treated to recover pulping chemicals or burned and discarded.

BRIEF DESCRIPTION OF DRAWINGS

The invention is further described by reference to the accompanying drawings in which:

FIG. 3 illustrates schematically a first embodiment and apparatus of the invention, with woodroom and primary clarifiers upstream of a drum or belt filter;

FIG. 4 illustrates schematically a second embodiment and apparatus of the invention similar to that of FIG. 3, but without the primary clarifier;

FIG. 5 illustrates schematically a third embodiment and apparatus of the invention without a primary clarifier but with post-filtration and membrane treatment; and FIG. 6 illustrates schematically a fourth embodiment and apparatus of the invention with a primary clarifier handling part of the effluent upstream of a drum filter.

DESCRIPTION OF PREFERRED EMBODIMENTS WITH REFERENCE TO THE DRAWINGS

Figure 1:
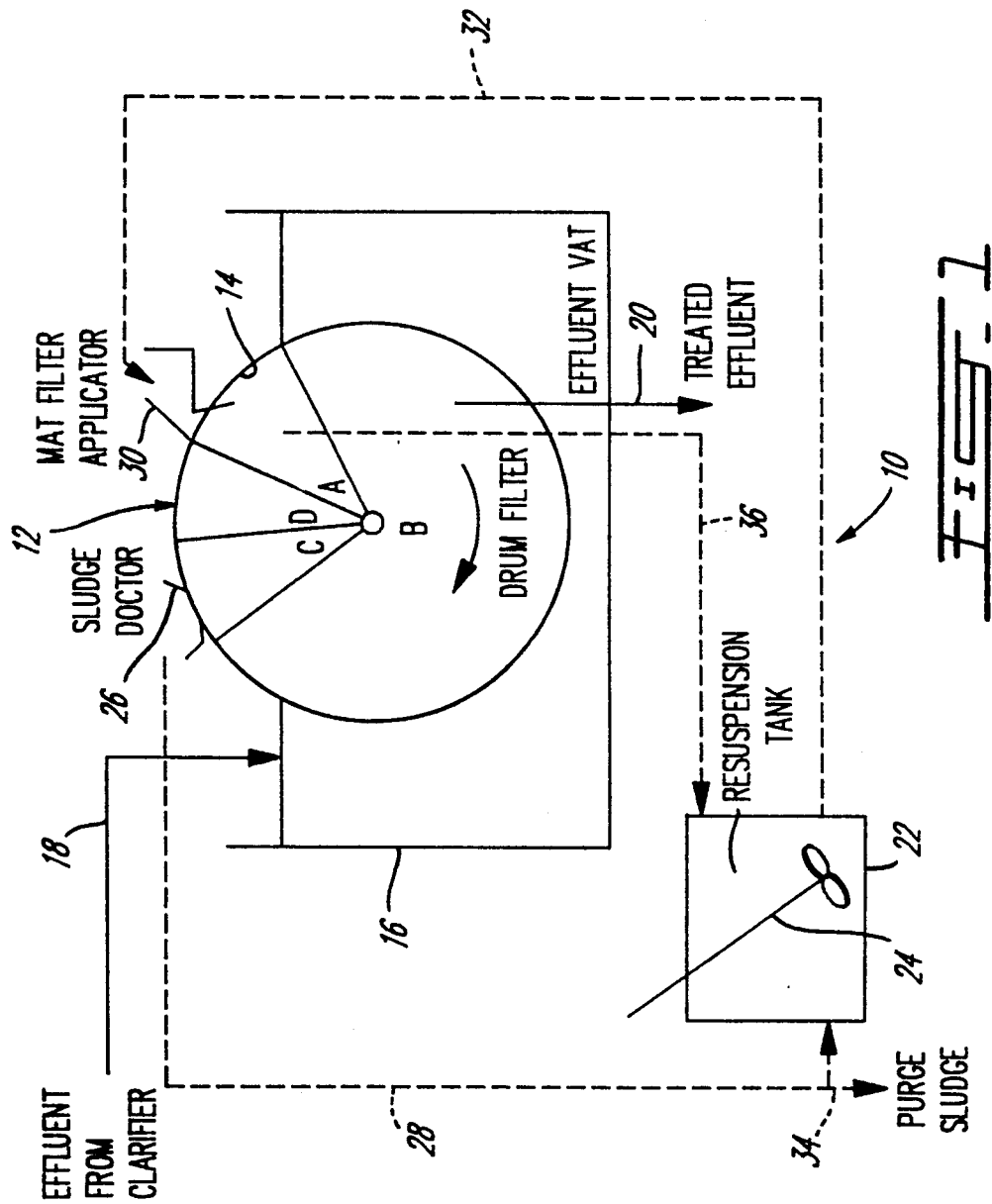
FIG. 1 illustrates schematically an assembly including a drum filter for carrying out the process of the invention.

With further reference to FIG. 1, there is shown an apparatus 10 for treating suspended solids which includes a drum 12 having a filter 14.

Drum 12 is mounted for rotation in a vat 16 having a feed inlet line 18 for effluent containing suspended solids and an effluent outline line 20. A line 36, which communicates with a resuspension tank 22 having a stirrer 24 provides the water produced in the mat formation step for mat resuspension.

A mat applicator 30 applies mill sludge fed from resuspension tank 22 along mat feed line 32, to the surface of filter 14 to form a mat filter maintained by means of vacuum or pressure (not shown).

A sludge doctor 26 removes the mat from filter 14 and recycles it along sludge line 28 to resuspension tank 22. A portion of the sludge in sludge line 28 is removed through purge line 34.

Drum 12 is divided into sectors A, B, C and D.

Figure 2:
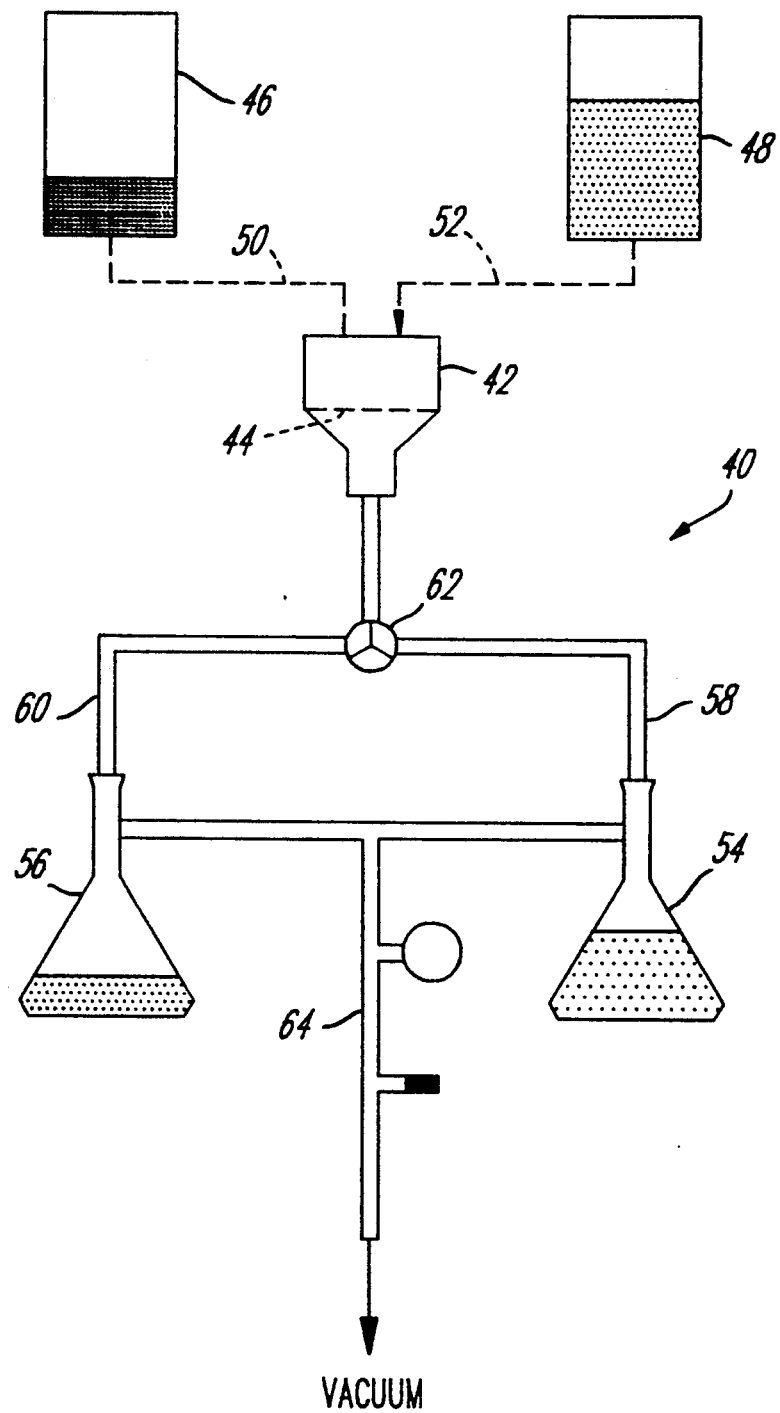
FIG. 2 illustrates schematically an experimental apparatus employed in a simulation of the process of the invention.

With further reference to FIG. 2, experimental apparatus 40 employed to simulate the process of the invention includes a filter device 42 having a screen 44, a source of mill sludge 46, and a suspended solids source 48.

A sludge feed line 50 communicates source 46 with filter device 42; and a suspended solids feedline 52 communicates source 48 with filter device 42.

Apparatus 40 further includes a treated effluent vessel 54 and a mat water vessel 56.

Effluent vessel 54 communicates with filter device 42 via effluent line 58 and mat water vessel 56 communicates with filter device 42 via mat water line 60.

A three-way valve 62 is disposed between filter device 42 and lines 58 and 60.

Vacuum line 64, having a pressure gauge and pressure control relief valve communicates via vessels 54 and 56 with filter device 42.

With further reference to FIGS. 3 to 6, there is shown different embodiments of treatment assemblies for use in the process of the invention.

For convenience the same integers are employed in the different figures for the same components.

With further reference to FIG. 3, a treatment assembly 70 includes a primary clarifier 72, a woodroom clarifier 74, a drum filter 76 and an optional secondary treatment station 78. It should be noted that the drum filter 76 embodies the filter drum, mat applicator, sludge doctor and the resuspension tank shown in FIG. 1.

Woodroom clarifier inlet line 80 communicates woodroom clarifier 74 with a pulp mill 84 and primary clarifier inlet line 82 communicates primary clarifier 72 with pulp mill 84.

Mat lines 86 and 88 communicate clarifiers 74 and 72 respectively with drum filter 76 to apply a mat of sludge on drum filter 76.

Suspended solids line 90 communicates with woodroom clarifier 74 and suspended solids line 92 communicates with primary clarifier 72 to feed suspension of suspended solids for treatment to the drum filter 76.

Effluent line 94 discharges treated effluent from drum filter 76 to the optional secondary treatment station 78 and effluent is recovered from outlet line 96.

An optional recycle line 98 communicates outlet line 96 with a water inlet line 102 which feeds pulp mill 84.

A screw press 100 assists in dewatering the mat removed from drum filter 76.

Pulp mill 84 further includes a wood inlet line 104 and a pulp line 106.

With further reference to FIG. 4, a treatment assembly 108 differs from assembly 70 of FIG. 3 in that it does not include the primary clarifier 72 and related components.

With further reference to FIG. 5, a treatment assembly 110 is similar to treatment assembly 108 of FIG. 4 but employs, in place of the secondary treatment station 78, a sand or multimedia filter 112, an ultra-filtration membrane 114 and reverse osmosis membrane 120.

A solids line 116 recycles solids from ultra-filtration membrane 114 and reverse osmosis membrane 120 to pulp mill 84. A filtrate line 124 recycle clean water from reverse osmosis membrane 120 to pulp mill 84. A backwash line 122 recycles a portion of clean water from reverse osmosis membrane 120 to filter 112, to clean the filter and the backwash line 118 feeds the filtered solids from filter 112 to drum filler 76 for formation of the mat.

With further reference to FIG. 6, a treatment assembly 126 is similar to assembly 70 of FIG. 3 but includes an effluent by-pass line 128, which feeds a portion of the suspended solids being fed to primary clarifier 72, directly to drum filter 76.

The proposed sludge-mat filtration process for removal of suspended solids can be effectively used for treating either combined mill effluents or individual wastewater streams such as the discharge stream from the screw-press in the pulp washing stage.

One embodiment of the present invention with the selected equipment proposed for achieving the removal of suspended solids from effluent streams is schematically shown in FIG. 1. The equipment configuration as shown consists of the rotating drum 12 having filter 14 defined by a perforated surface or a perforated covering belt. It should be clearly understood that various screens or belt filters can be used in place of the drum filter 14 described here by way of illustration. A vacuum, typically 100–700 mm Hg, is maintained inside the drum 12 by a suitable barometric leg or vacuum pump. An external pressure could be applied on the drum or belt filter instead of vacuum inside.

The process consists of the following steps:

1. Formation of the sludge mat on a drum or endless screen 14.
2. Filtration of the effluent.

3. Removal of the thickened sludge from the screen 14.

4. Purging a portion of the sludge for incineration/landfill.

5. Addition of makeup sludge if required/available.

6. Resuspension of the dewatered sludge in the water used for mat formation in the previous step.

As shown in FIG. 1, the interior of the drum 12 is divided into 4 sectors. Step 1 is performed on the drum 12 at sector A in FIG. 1., step 2 at sector B and step 3 at sector C. Sector D represents a dead or lag zone where no specific operation takes place. This sector can be used for cleaning of the belt or the drum screen, if required.

The angle of each sector, diameter of the drum 12 and rotational speed will depend on the filterability of the effluent and the sludge characteristics.

Suitably the drum rotates at a relatively slow speed of 0.2 to 3 rpm, and preferably below 1 rpm. The mat is formed on sector A as shown in FIG. 1 and effluent in vat 16 is drawn into the mat with the aid of the vacuum applied to the interior of the drum, this vacuum also stabilizes the formed mat on the drum. The suspended solids are retained in the mat and the aqueous vehicle of the effluent passes through the mat and the screen.

At the end of each filtration phase B of the revolution of drum 12, the mat containing suspended solids from the effluent is removed by sludge doctor 26, whereafter a fresh mat is formed by applicator 30.

In tis way the mat is replaced after each revolution of drum 12, and of high filtering efficiency is maintained One modification of the above process (steps 1-6) would entail (i) Suspending the mat (step 6) in a portion of the effluent and (ii) mixing the water filtered through during mat formulation (Step 1) with the feed to the drum. This modification could be used in cases when the total solids level of the water used for resuspending the mat increases very rapidly.

Another modification to the process may include addition of calcium chloride or other suitable settling aids, for example, to the effluent streato enhance the removal of suspended solids in the pretreatment stage by settling. It was observed in jar tests that the addition of calcium chlorides, at a dosage of 25 to 400 mg Ca/l to CTMP mill effluents, removed up to about 90% of the suspended solids upon subsequent settling, while simple setting without calcium chlorides addition remove only 60-70%.

Alternatively, filtration aids such as diatomaceous earth, lime mud, etc., can be used to augment removal of colloidal material. In such a process the filtration aid would not be removed after each cycle like the sludge mat, but would be removed and replaced when it becomes plugged, depending on usage.

In order to disclose more clearly the nature of the present invention, tho following examples illustrating the invention are given.

EXAMPLES

EXAMPLE 1

Experimental apparatus 40 to simulate the process consisted of a filtration screen 14, two separate liquid collection chambers 54 and 56 (one for water from mat formation and resuspension and another for collection of treated effluent), a three way valve 62, and appropriate vacuum source (see FIG. 2). The filter area used in the experiments was $1.26 \times 10^{-3}$ m$^2$.

Combined CTMP mill effluents used in the experiments were obtained from two CTMP mills in Quebec, Canada. Mill I used softwood and Mill II used hardwood for pulping. The effluent was homogenized and brought to the required temperature in a constant temperature bath. Effluent aliquots of 50 ml were taken for each experiment. The amount of sludge used to form the filter mat was based on estimated fiber loss of 1-2% during the pulping process (oven dry basis). Combined primary sludges from the respective mills were used for formation of the mat. After the mat was formed 50 ml of the effluent sample was filtered through it. The mat was removed and resuspended in the mat formation water and formed again. The experiments were conducted at 20° C. and 60° C.

The experiments were conducted until steady-state conditions were reached, typically, 15-25 filtration cycles. This was determined by the time required for filtration of each aliquot (i.e., the filtration rate) to reach a plateau. Table I shows the steady-state filtration rates for the two mill effluents at different temperatures and the removal of total suspended solids.

TABLE I

Results of filtration experiment. Operating vacuum: 380 mm Hg.

| Effluent | Temp. °C. | Filtration Rate, L/m$^2$·h | Total Suspended Solids | |
|---|---|---|---|---|
| | | | Initial | Final |
| Mill I | 20 | 5730 | 660 | 100 |
| Mill II | 20 | 1800 | 560 | 15 |
| Mill II | 60 | 2200 | 560 | 5 |

It can be seen in Table I that removal of more than 85% was obtained for CTMP mill effluents from Mill I at 20° C. and higher than 97-99% suspended solids removal was achieved for effluents from Mill II at 20° and 60° C., respectively. This clearly demonstrates that the process eliminates most or virtually all of the suspended solids and hence would improve the effluent treatment efficiency in the subsequent secondary treatment.

The process can be applied in pulp and paper mills for different scenarios. They are presented in the examples which follow.

| Mat filtration processes for pulp mills: | |
|---|---|
| Alternative I: | with woodroom and primary clarifiers before the filter. |
| Alternative II: | without primary clarifiers. |
| Alternative III: | without primary clarifier, with sand/multi-media filters and membrane treatment. |
| Alternative IV: | with new/existing primary clarifier handling part of the effluent before mat filters. |

EXAMPLE 2

The Alternative I for removal of effluent suspended solids by mat filtration, schematically shown in FIG. 3, was simulated on a laboratory scale. Effluent obtained from a hardwood pulping (Mill I) was used for these experiments (no woodroom clarifier sludge was included in these tests). The primary clarifier was replaced by a jar in which the effluent was stirred rapidly at 100 rpm for 2 minutes followed by slow stirring at 20 rpm for 20 minutes. The settleable solids were separated from the supernatant and used for formation of the mat.

The supernatant was filtered through the sludge mat. The tests were conducted at 3 vacuum levels (305, 381 and 458 mm Hg). The results of the experiment are given in Table II.

The results show that if a primary clarifier followed by mat filtration is used, overall removal of suspended solids can be higher than 95%. No chemical addition is required. The effluent from this stage can be sent to the secondary treatment or for reuse in the mill.

TABLE II

Filtration experiments with simulated settling of effluents followed by mat filtration for removal of settleable solids.

| Stream Number in FIG. 3 | Vacuum, mm Hg | Filtration Rate, L/m² · h | Suspended Solids, mg/L |
|---|---|---|---|
| 1 | — | — | 539 |
| 2 | — | — | 121 |
| 3 | 305 | 1100 | 32 |
| 3 | 381 | 1860 | 29 |
| 3 | 458 | 1200 | 39 |

EXAMPLE 3

The Alternative II, without a primary clarifier but including a woodroom clarifier, is presented in this example (see FIG. 4). In this embodiment the effluent from the pulp mill is sent directly to the filter. The solids removed by the mat filter are disposed of and the treated water is either recycled or sent to secondary treatment. This scheme would be particularly useful at mill sites where strict land restrictions apply. It could also be used in new mills with significant cost savings, because of the high capital required for clarifiers.

The experiments were initiated by using the settled sludge generated as in Example 2. The raw effluent as obtained from the Mill I. The filtration process was self sustaining with the solids removed during filtration. No addition of sludge was required. The results of the filtration experiments are given in Table III.

TABLE III

Filtration experiments with unsettled effluent. Temperature 20° C.

| Stream Number in FIG. 4 | Applied Vacuum, mm Hg | Filtration Rate, L/m² · h | Suspended Solids, mg/L |
|---|---|---|---|
| 1 | — | — | 539 |
| 2 | 305 | 493 | 8 |
| 2 | 381 | 606 | 8 |
| 2 | 458 | 404 | 8 |

The results presented in Table III indicate that the separation efficiencies achieved by mat filtration of the effluent from the CTMP pulp mill were very high. However, the filtration rates were lower than those obtained with clarified effluents, as demonstrated in Examples 1 and 2.

As shown in FIG. 5 (Alternative III), high quality water for recycle and a concentrated stream for recovery can be obtained. This scheme includes the use of a sand or multimedia filter to reduce the TSS (<8 ppm) of the inlet flow to the sensitive membrane treatment or other separation processes like evaporation or freeze crystallization. Additionally an ultra-filtration membrane and a reverse osmosis membrane are employed in the post treatment.

A hybrid of Alternatives I and II is shown in FIG. 6 where a portion of the effluent is settled and the rest is sent to the filtration stage directly. Stream 1 in this case could be divided according to the requirements of the overall process.

EXAMPLE 4

Pretreatment of the effluent with calcium chloride has a significant impact on the settling characteristics of the effluent in the primary clarifier. The process schematic considered in this example is shown by Alternative I in FIG. 3. Calcium chloride is added in the inlet to the primary clarifier (stream 1 in line 82). The sludge from the clarifier would be used for mat formation while the clarified effluent (stream 2 in line 92) would be used as the feed for the mat filtration to produce the clear filtrate (stream 3 in line 94). The results of the filtration experiment using the above configuration are given in Table IV.

TABLE IV

Filtration of presettled effluents with calcium addition in the settling tank. Calcium chloride level: 25 mg/L as Ca.

| Stream Number in FIG. 3 | Vacuum, mm Hg | Filtration Rate, L/m² · h | Suspended Solids, mg/L |
|---|---|---|---|
| 1 | — | — | 539 |
| 2 | — | — | 136 |
| 3 | 381 | 1470 | 14 |

The result from the above experiments show that the filtration rates with the addition of calcium chloride (1470 L/m²·h) are lower than those without calcium chloride (1860 L/m²·h) (see Table II). However the residual suspended solid level (14 mg/L) was lower than that without calcium chloride addition (29 mg/L). While the lower filtration rate would be less economical, the faster settling rate of the effluent solids in the primary clarifier could offset the slower filtration rates.

EXAMPLE 5

The magnitudes of the various operations of the proposed process for a mill that produces 500 tons of air dry pulp per day and has an effluent flow of 20 m³ per ton of air dry pulp are shown in Table V.

TABLE V

Magnitudes of applications of the proposed process.

| | | |
|---|---|---|
| Effluent volume to be treated | m³/h | 417 |
| Suspended solids level | mg/L | 600 |
| Filtration rate (Example 1) | L/m² · h | 5730 |
| Filtration area required | m² | 73 |
| Sludge resuspension tank volume | m³ | 3 |

When this process is used for the removal of suspended solids, the filtered water can be further processed in secondary treatment or can be reused in other operations at the mill, such as debarking drums.

EXAMPLE 6

In addition to an excellent removal of suspended solids, the process also removes substantial amounts of wood extractives in terms of resin and fatty acids (RFA) and turbidity. For instance, in filtration tests with total CTMP mill effluent, as per Alternative I (see FIG. 3), the initial RFA level of 15.1 mg/L was decreased to 1.4 mg/L upon primary sludge (PS) mat filtration, for a removal of 91% (refer to Table VI). Simultaneously, effluent turbidity was reduced from 220 to 103 N.T.U.

A comparable treatment of paper machine rich whitewater (RWW) reduced the RFA content from 8.9 to 2.7 mg/L (removal, 70%) and turbidity from 600 to 280 N.T.U.

Similarly, with CTMP screw press filtrate (SPF), the initial RFA level of 43 mg/L was reduced to 5.5 mg/L representing a removal of 87%. A laboratory solution of tall oil (TO), containing wood extractives, was reduced in RFA from 173 to 74 mg/L upon mat filtration.

TABLE VI

Removal of total suspended solids, resin and fatty acids and turbidity.

| Effluent | Stream No. | Vacuum, mm Hg | Filtration Rate, L/m²h | TSS, mg/L | RFA, mg/L | Turbidity, N.T.U. |
|---|---|---|---|---|---|---|
| CTMP | 2 | — | — | 167 | 15.1 | 220 |
| CTMP | 3 | 305 | 2700 | 38 | 1.4 | 103 |
| RWW | 2 | — | — | 540 | 8.9 | 600 |
| RWW | 3 | 305 | 1040 | 11 | 2.7 | 280 |
| SPF | 2 | — | — | 5679 | 43 | ND |
| SPF | 3 | 305 | 1680 | 974 | 5.5 | ND |
| TO | 2 | — | — | ND | 173 | ND |
| TO | 3 | 305 | 2140 | ND | 74 | ND |

EXAMPLE 7

This example demonstrates that the effectiveness of the mat filtration process results from the unique filtration capability of the primary sludge (PS) mat. In parallel tests using (i) PS mat and (ii) CTMP pulp mat, the PS mat removed 89% of TSS, 40% of RFA and effluent turbidity was decreased from 470 N.T.U. to 240 N.T.U. (see Table VII).

In contrast, the removal efficiency of CTMP pulp mat of a comparable solids charge was very low (6% and 0%, in terms of TSS and RFA) and the effluent turbidity was practically not affected by the filtration process.

TABLE VII

Efficiency comparison of mat filtration using (i) primary sludge mat and (ii) CTMP pulp mat.

| Effluent | Stream No. | Vacuum, mm Hg | Filtration Rate, L/m²h | TSS, mg/L | RFA, mg/L | Turbidity, N.T.U. |
|---|---|---|---|---|---|---|
| CTMP | 1 | — | — | 1388 | 27.3 | 430 |
| CTMP | 2 | — | — | 775 | 24.3 | 470 |
| CTMP | 3A[1] | 305 | 85900 | 727 | 25.9 | 490 |
| CTMP | 3B[2] | 305 | 552 | 82 | 14.5 | 240 |

[1] CTMP pulp mat used.
[2] Primary sludge mat used.

Streams 1, 2 and 3 are shown in FIG. 3, in which stream 2 is the feed stream to the drum filter and stream 3 is the discharge stream from the drum filter. Stream 1 is the stream prior to the primary clarifier.

It will be understood that the process is not limited to a drum filter and that various filtering devices or combinations of different devices can be employed; for example, the drum might be replaced by an endless horizontal belt filter with two feed boxes, one for the sludge mat and another for the pulp mill effluent. Separate suction boxes under the belt filter would collect the separate water streams.

We claim:

1. A process for removal of suspended solids containing colloidal particles of resin and fatty acids from a pulp mill effluent comprising:
   i) forming a mat of non-biological sludge on a porous support, said sludge being selected from the group consisting of pulp mill primary sludge, woodroom sludge, and a mixture of primary and secondary pulp mill sludges, and
   ii) passing pulp mill effluent comprising an aqueous vehicle containing suspended solids containing colloidal particles of resin and fatty acids through said mat whereby the suspended solids containing colloidal particles of resin and fatty acids are retained in said mat and the aqueous vehicle passes through said mat and said porous support.

2. A process of claim 1, in which said sludge, is a pulp mill primary sludge.

3. A process of claim 1, in which said sludge is a woodroom sludge.

4. A process of claim 1, in which said sludge is a mixture of primary and secondary pulp mill sludges.

5. A process according to claim 1, wherein said support comprises a drum rotating at 0.2–3 rpm.

6. A process according to claim 5, wherein said mat is formed on said support on a first sector of said drum and including subjecting the interior of the drum to a vacuum to hold said mat on said first sector and draw said aqueous vehicle through said mat and porous support.

7. A process according to claim 6, in which said mat is formed on said support in a thickness of 0.5 to 25 mm from a fluid sludge suspension having a sludge concentration of 3 to 5%, by weight, said mat having a specific filtration resistance of $4 \times 10^{12}$ to $1 \times 10^{13}$ m/kg.

8. A process according to claim 7, wherein said mat containing filtered suspended solids from said pulp mill effluent is removed after each revolution of said drum and a new mat of said sludge is formed on said sector.

9. A process according to claim 1, including iii) removing said mat and retained suspended solids from said support after step ii) and repeating stops i), ii) and iii) sequentially.

10. A process according to claim 9, in which said porous support comprises a filtration aid which is not removed after each cycle, but is removed and replaced periodically, after a plurality of cycles.

11. A process according to claim 10, wherein said filtration aid is selected from diatomaceous earth and lime mud.

12. A process according to claim 1, including subjecting the pulp mill effluent to a pretreatment settling and adding calcium chloride in a concentration in the effluent of 25 to 400 mg Ca/l.

13. A process according to claim 1, in which said porous support comprises a filtration aid which is not removed after each cycle, but is removed and replaced periodically, after a plurality of cycles.

14. A process according to claim 13, wherein said filtration aid is selected from diatomaceous earth and lime mud.

15. A process for the removal of colloidal particles of resin and fatty acids from a pulp mill effluent comprising:
   a) forming a mat of sludge on a porous drum support, said mat having a thickness of about 0.5 to 25 mm and a specific filtration resistance of about $4 \times 10^{12}$ to $1 \times 10^{13}$ m/kg, said sludge being selected from the group consisting of pulp mill primary sludge, woodroom sludge, and a mixture of primary and secondary pulp mill sludges,
   b) rotating said drum at about 0.2 to 3 rpm through a pulp mill effluent containing colloidal particles of resin and fatty acids suspended in an aqueous vehicle, c) drawing said effluent through said mat with retention of said colloidal particles by said mat and passage of said aqueous vehicle into an interior of said porous drum support.

16. A process according to claim 15, including:

d) removing said mat and returned particles after each rotation of said drum support, removing said aqueous vehicle from the interior of said porous drum support, and repeating steps a), b), c) and d), sequentially.

17. A process according to claim 16, wherein the removed mat and removed aqueous vehicle from step d) are passed to a resuspension tank, a portion of said removed mat being purged; resuspending particles of the removed mat in an aqueous vehicle which comprises removed aqueous vehicle from step d), to form an aqueous suspension of mat-forming particles; and recycling said aqueous suspension of mat-forming particles to said porous drum support to form said mat in step a).

18. A process according to claim 16, wherein said sludge comprises pulp mill primary sludge.

19. A process according to claim 18, wherein step a) comprises forming said mat on a first second of said drum, and including subjecting the interior of the drum to a vacuum to hold said mat on said first sector, said vacuum also serving to draw the effluent through the mat in step d).

* * * * *

UNITED STATES PATENT AND TRADEMARK OFFICE
CERTIFICATE OF CORRECTION

PATENT NO. : 5,290,454
DATED : March 1, 1994
INVENTOR(S) : Joseph Dorica et al

It is certified that error appears in the above-identified patent and that said Letters Patent is hereby corrected as shown below:

In item 73 on the cover page, in the identification of the Assignee, delete "Pump" and insert therefor --Pulp--.

In item 57 on the cover page, in the first line of the abstract, after "A process is" insert --presented--.

At column 1, line 31, delete "O'Brian" and insert therefor --O'Brien--.

At column 1, lines 31 to 32, delete "discloses" and insert therefor --disclose--.

At column 1, line 53, after "4,782,789," insert --withdrawn,--

At column 2, line 58, delete "o" and insert therefor --of--.

At column 5, line 30, delete "tis" and insert therefor --this--.

At column 5, line 35, delete "formulation" and insert therefor --formation--.

At column 5, line 41, delete "streato" and insert therefor --stream--.

At column 5, line 44, delete "chlorides" and insert therefor --chloride--.

At column 5, line 47, delete "setting" and insert therefore --settling--.

At column 5, line 47, delete "chlorides" and insert therefor --chloride--.

At column 5, lines 47 to 48, delete "remove" and insert therefor --removed--.

At column 5, line 56, delete "tho" and insert therefore --the--.

At column 10, line 36, delete "stops" and insert therefore --steps--.

UNITED STATES PATENT AND TRADEMARK OFFICE
CERTIFICATE OF CORRECTION

PATENT NO. : 5,290,454
DATED : March 1, 1994
INVENTOR(S) : Joseph Dorica, et al

It is certified that error appears in the above-indentified patent and that said Letters Patent is hereby corrected as shown below:

At column 12, line 11, delete "second" and insert therefor --sector--.

Signed and Sealed this

Sixth Day of December, 1994

Attest:

BRUCE LEHMAN

Attesting Officer

Commissioner of Patents and Trademarks